[United States Patent Office — 3,444,195 — Patented May 13, 1969]

3,444,195
GAUCHE FORM SUCCINIC ACID
Tadataka Hara, Tokyo, Japan, assignor of one-half to Kaken Kagaku Kabushiki Kaisha, Tokyo, Japan, a corporation of Japan
Continuation of application Ser. No. 860,227, Dec. 17, 1959. This application July 14, 1966, Ser. No. 565,318
Claims priority, application Japan, Jan. 14, 1959, 34/534; June 29, 1959, 34/20,893
Int. Cl. C07c 55/10, 51/00, 51/48
U.S. Cl. 260—537                                   2 Claims

ABSTRACT OF THE DISCLOSURE

There is provided the novel material identified as cis-succinic acid of gauche form having a molecular weight of about 120, being about 40.83% by weight carbon, 5.14% hydrogen and 54.03% oxygen, having a positive specific rotation in aqueous solution and having a single maximum in ultra-violet absorption spectrum at 200 m$\mu$. A process is provided for producing the novel material as well as allotropic modifications thereof. Also provided is a process for deodorizing amino acids-containing materials by contacting such materials with the novel product of this invention.

---

This application is a continuation of Ser. No. 860,227, filed Dec. 17, 1959, now abandoned.

This invention relates to a new and useful compound called cis-succinic acid of "Gauche" form. It is also concerned with the production of this compound, particularly by fermentation, and its recovery and concentration from crude solutions, including fermentation broths. The invention embraces the substance in dilute solutions, as crude concentrates, and in purified form. The new compound is useful as a deodorizing material for amino acid-containing substances.

I have found that this new compound called cis-succinic acid of Gauche form, i.e. the levo-rotational isomer, can be formed during the cultivation under controlled conditions of a strain of Saccharomyces genus.

Accordingly it is the main object of the present invention to provide a new and useful compound called cis-succinic acid of Gauche form and the process for the production thereof, particularly by fermentation. Other objects, features, capabilities and advantages comprehended by the present invention will be apparent from the description and claims that follow.

Referring to the drawings.

Figure 1:
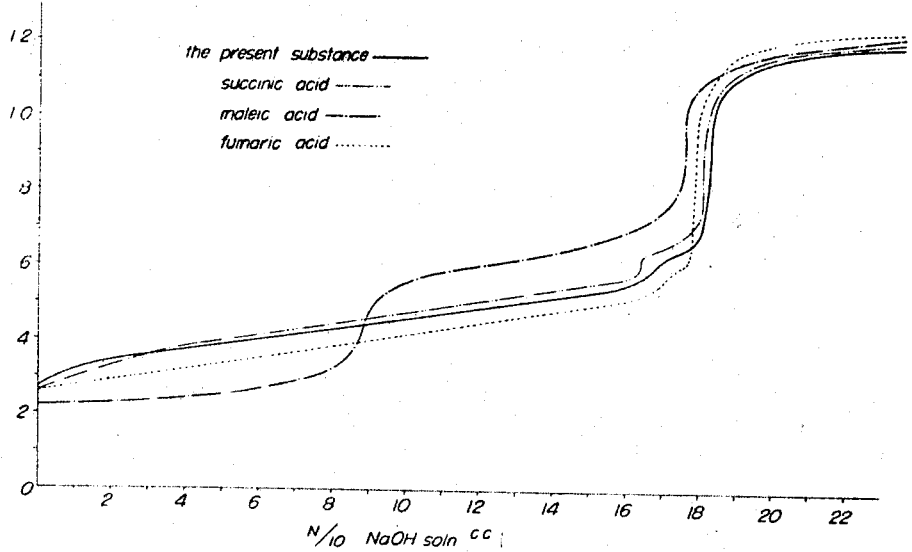
FIG. 1 is a curve of the titration of $\beta$-cis-succinic acid in Gauche form, with N/10 sodium hydroxide aqueous solution.

This new compound, cis-succinic acid of Gauche form, can be formed by growing the microorganism, Saccharomyces steineri var. Hara in a suitable nutrient medium under appropriate stationary or submerged aerobic (viz, shaken) conditions. This strain, which we have isolated from home-made fermented grape juice, and which we designate as Saccharomyces steineri var. Hara, is so similar in cultural characteristics to a strain of Saccharomyces steineri with minor exceptions that I consider it to belong to the same species, Saccharomyces steineri. A culture of the living microorganism has been deposited with and is available from the American Type Culture Collection; it has been designated as ATCC No. 13668.

The strain was isolated from the fermented grape juice, and the method of isolation is as follows: Well washed grape was milled and then placed in a sterile flask with cotton-seal. Fermentation was carried out at 25° C. for 3 to 4 days. During this period, the flask was stirred by shaking it twice a day. At the end of fermentation, a fermentation liquor was removed with a platinum loop and were inoculated to malt agar plate. The plate was incubated at 25° C. for 48 hours. On the plate surface, the pale yellow, creamy colonies of the desired Saccharomyces steineri var. Hara and the white, filmy wrinkled colonies were formed, the former colonies being collected to provide the desired microorganism.

The present invention will be described with particular reference to the above-mentioned strain of the organism, but it is to be understood that the fermentative processes of this invention not only embrace the use of Saccharomyces steineri var. Hara but also other "Gauche" form cis-succinic acid-producing strains of Saccharomyces genus, such strains being readily produced and isolated by routinely applied isolation and strain-modification methods which include selection of cultured organisms, and exposure of organisms to modifying means such as X-ray, ultraviolet light, and chemical agents, for example, the nitrogen mustards. Illustrative examples of other Gauche form cis-succinic acid-producing strains are Saccharomyces cerevisiae, Saccharomyces cerevisiae var. ellipsoideus, and Saccharomyces willianus.

Saccharomyces steineri var. Hara (ATCC No. 13668) is characterized by the physical, cultural, and physiological tests set forth in the following table and paragraphs.

Growth on malt juice.—This yeast shows good vegetative growth on malt juice at 25° C. After three days incubation, cells are oval or elongate, $$3.0\text{–}7.0 \times 5.0\text{–}12.0\mu$$

in size. Usual proportion of length to breath is 1:2, but some variety is observed. Each of cells by itself has the same activity as of budding cells, and forms white colored deposit in the culture medium. The yeast is not film forming.

Growth on malt agar.—The growth of the yeast on malt agar is just equal to that on malt juice. There is not any significant difference in shape and size of cells. The colonies of the strain are round, semi-glossy, light yellow-white colored creamy.

After cultivations of the slant culture for one month, the colonies are found to be yollowish-white colored, creamy soft semi-glossy and smooth, not wrinkled.

Slide culture: Pseudomycelium is not found. (An original strain of Sacch. steineri, and strains of Sacch. cerevisiae, Sacch. cerevisiae var. ellipsoideus and Sacch. willianus are different from each other in their shape, and therefore the present strain can be macroscopically distinguished from them.)

Sporulation: spores are readily formed on malt agar. Usually an ascus contains four round ascospores. In this point the present strain is differed from an original strain of Sacch. steineri.

Fermentation of various sugars.—The present strain Saccharomyces steineri var. Hara shows the following fermentative activity to various sugars:

Glucose—(+)
Galactose—(+)
Maltose—(+)
Saccharose—(+)
Lactose—(−)
Raffinose—(−)

Assimilation of potassium nitrate.—Potassium nitrate is not assimilated by this yeast.

Decomposition of arbutin.—This yeast does not decompose arbutin. The comparative table with respect to the present strain and other assembling known yeast is as follows:

fered from the strains of other species. This strain forms two ascopores in ascus, while the original strain of Sacch. steineri usually forms four ascopores. This is such characteristic which differs this strain from the latter.

|  | Shape of the cell | Size of the cell | Sediment formation | Ring formation | Pseudomycelium | Sporulation |
|---|---|---|---|---|---|---|
| The present strain | Oval to elongate |  | + | + (thin or no) | + tree-like | Round, mostly 4/ascus. |
| Saccharomyces steineri | Oval to long-oval | 3–8 x 5–14μ | + | + (thin) | do | Round 2–4/ascus mostly 2. |
| Sacch. willianus | Oval to elongate | 2.2–5.5 x 6–14–33μ<br>3–6.5 x 6.5–14–23μ<br>4–7 x 8–16–22μ | + | + | +tree-formation | Round or oval 1–4/ascus. |
| Sacch. cere. var. ellipsoideus | Oval to long-oval | 3.5–9.5 x 6–14–20μ<br>2.5–6 x 3.5–13μ<br>3–7.5 x 5–14μ | + | + | +(poor) | Do. |
| Sacch. cerevisiae | Round, short-oval or oval | 5–10 x 6–12μ<br>3–7 x 4.5–10μ<br>3.5–8 x 5–15μ | + | ± | +, −(one third of the strain). | Round or slightly oval 1–4/ascus. |
| Sacch. pastorianus | Oval, elongate or sausage-shaped. | 2.5–4 x 7–26μ | + | + | +tree-formation | Round 1–4/ascus. |
| Sacch. carlsbergenisis | Round, short-oval or oval | 5–10 x 5–13μ<br>4–8.5 x 5–15.5μ | + | + | −usually, +(elongate cells) | Do. |
| Sacch. heterogenicus | Oval to long-oval | 3–6 x 6–12μ | + | + | +tree-like | Do. |
| Sacch. italicus | do | 4–8 x 5–15μ | + | + | +(primitive) | Do. |

|  | Fermentation | | | | | | Sugar assimilation | | | | |
|---|---|---|---|---|---|---|---|---|---|---|---|
|  | Glucose | Maltose | Galactose | Lactose | Saccharose | Raffinose | Glucose | Maltose | Galactose | Lactose | Saccharose |
| The present strain | + | + | + | − | + | − | + | + | + | − | + |
| Saccharomyces steineri | + | + | + | − | + | − | + | + | + | − | + |
| Sacch. willianus | + | + | + (weak) | − | + | +⅓ | + | + | + | − | + |
| Sacch. cere. var. ellipsoideus | + | + | + | − | + | +⅓ | + | + | + | − | + |
| Sacch. cerevisiae | + | + | + (weak or −) | − | + | +⅓ | + | + | + (weak) | − | + |
| Sacch. pastorianus | + | + | − | − | + | +⅔ + (complete) | + | + | − | − | + |
| Sacch. carlsbergenisis | + | + | + | − | + |  | + | + | + | − | + |
| Sacch. heterogenicus | + | + | − | − | + | − | + | + | − | − | + |
| Sacch. italicus | + | + | + | − | − or weak | − | + | + | − | − | + |

|  | Assimilation of Potassium nitrate | Ethanol as sole source of carbon | Splitting of arbutin |
|---|---|---|---|
| The present strain | Absent | No growth | Absent. |
| Saccharomyces steineri | do | do | Do. |
| Sacch. willianus | do | No growth or weak growth | Do. |
| Sacch. cere. var. ellipsoideus | do | Usually no growth weak or normal growth | Do. |
| Sacch. cerevisiae | do | Usually no growth occasionally weak or normal growth | Do. |
| Sacch. pastorianus | do | No growth | Do. |
| Sacch. carlsbergenisis | do | do | Do. |
| Sacch. heterogenicus | do | do | Do. |
| Sacch. italicus | do | do | Do. |

The classification and diagnosis are performed based upon "The Yeasts" a toxonomic study by J. Lodder and N. J. W. Kreger—Van Rij North-Holland Publishing Co. Amsterdam 01952).

As the result of the tests stated, the strain Saccharomyces has been identified as a new strain of Saccharomyces steineri. Analogous strains include Sacch. cerevisiae, Sacch. steineri, Sacch. ellipsoideus, Sacch. willianus, etc. In the fermentative activity for raffinose, this strain is similar to Sacch. steineri, and dif- In the present invention, grape juice or malt juice may be used as culture medium. Malt juice is more preferred because it is readily commercially available. Of course other culture media including cane sugar juice, Henneberg's synthetic medium, etc. can be used to produce β-cis-succinic acid of Gauche form.

Table 1 shows the result of fermentation tests using shaking culture at 27° C. for 72 hours. A series of these tests was carried out for determining the usefulness of various culture media.

TABLE 1

|  |  | Before cultivation | | After cultivation | |
|---|---|---|---|---|---|
| Culture medium | Deodorization effect | Sugar contained, percent | pH | Sugar contained, percent | pH |
| Grape juice | ++ | 15 | 3.5 | 4.6 | 2.5 |
| Malt juice | ++ | 15 | 5.0 | 4.0 | 3.2 |
| Henneberg's synthetic medium (Nitrogen source): |  |  |  |  |  |
| Peptone | + | 15 | 7.0 | 8.8 | 4.0 |
| Asparagine | ± | 15 | 7.0 | 9.5 | 5.6 |
| Ammonium sulfate | − | 15 | 7.0 | 9.8 | 5.8 |
| Ammonium nitrate | ± | 15 | 7.0 | 9.7 | 5.8 |
| Ammonium chloride | ± | 15 | 7.0 | 9.2 | 4.8–5.0 |
| Sodium nitrate | − | 15 | 7.0 | 12.4 | 6.4–6.2 |

Table 2 shows the result of fermentation tests using standing culture at 27° C. for 14 days. A series of these tests was carried out for determining the usefulness of various culture media.

TABLE 2

| Culture medium | Deodorization effect | Before cultivation Sugar contained, percent | pH | After cultivation Sugar contained, percent | pH |
|---|---|---|---|---|---|
| Grape juice | ++ | 15.0 | 3.5 | 8.5 | 3.0 |
| Malt juice | ++ | 15.0 | 5.0 | 9.0 | 4.0 |
| Henneberg's synthetic medium (Nitrogen source): | | | | | |
| Peptone | + | 15.0 | 7.0 | 13.0 | 5.4 |
| Asparagine | ± | 15.0 | 7.0 | 14.0 | 6.2 |
| Ammonium sulfate | − | 15.0 | 7.0 | 14.0 | 7.2–6.8 |
| Ammonium nitrate | ± | 15.0 | 7.0 | 14.6 | 6.4 |
| Ammonium chloride | ± | 15.0 | 7.0 | 14.0 | 6.0 |
| Sodium nitrate | − | 15.0 | 7.0 | 14.8 | 7.0–6.8 |

With respect to cultivation method of the present invention, any of standing culture, shaking culture, submerged aerated culture, etc. may be employed to form β-cis-succinic acid of Gauche form. However, when aerobic cultivation such as by shaking culture and submerged aerated culture is employed, the time required for cultivation is highly minimized. Accordingly, such methods are more preferably used for the purpose of the invention, as compared with stationary cultivation methods. Under aerobic conditions, the cultivation may be successfully carried out at about 20° to 30° C. for about 72–96 hours. When stationary conditions are applied to cultivation, it should be carried out at about 20° to 30° C. for about 14–21 days.

amounts of known, commercially available succinic acid (optical isomer) and maleic acid or maleic anhydride is dissolved with twice amount of 50% alcohol with heat. After cooling to a temperature below 50° C., the resulting solution is combined with the yeast-containing liquor. While shielding from day light, the resulting mixture is concentrated under reduced pressure to yield crude crystal of β-cis-succinic acid of Gauche form.

With respect to the production of β-cis-succinic acid of Gauche form, typical procedures used for carrying out the invention will be described in the following paragraphs.

Cultivation of *Sacch. steineri* var. Hara.—Two hundred milliliters of malt juice was charged into a 500 cc.-volume Sakaguchi flask and then sterilized with heat at 120° C. for 20 minutes. After cooling, a strain *Sacch. steineri* var. Hara was planted to the flask. Before cultivation, malt juice preferably had a pH of 4.6 to 5.6 and

TABLE 3.—STANDING CULTURE TEST

| Medium | Temp., °C. | 0 day Sugar, percent | pH | Deodorization effect | 7 days Sugar, percent | pH | Deodorization effect | 14 days Sugar, percent | pH | Deodorization effect | 21 days Sugar, percent | pH |
|---|---|---|---|---|---|---|---|---|---|---|---|---|
| Grape juice | 27–30 | 14.6 | 3.5 | ± | 7.9 | 3.0 | + | 6.4 | 2.7 | ++ | 4.6 | 2.5 |
|  | 15–20 | 14.6 | 3.5 | − | 8.2 | 3.2 | ± | 7.2 | 3.0 | + | 6.6 | 2.8 |
|  | 5 | 14.6 | 3.5 | − | 9.4 | 3.4 | ± | 7.6 | 3.2 | + | 7.4 | 3.0 |
| Malt juice | 27–30 | 13.2 | 5.0 | − | 8.6 | 3.4 | + | 5.4 | 3.0 | ++ | 3.2 | 2.7 |
|  | 15–20 | 13.2 | 5.0 | − | 9.6 | 3.8 | ± | 7.4 | 3.2 | + | 4.0 | 2.9 |
|  | 5 | 13.2 | 5.0 | − | 11.4 | 4.6 | − | 10.0 | 4.0 | ± | 8.6 | 3.8 |

TABLE 4.—SHAKING CULTURE TEST

| Medium | Temp., °C. | 0 hr. Sugar, percent | pH | Deodorization effect | 24 hrs. Sugar, percent | pH | Deodorization effect | 48 hrs. Sugar, percent | pH | Deodorization effect | 72 hrs. Sugar, percent | pH |
|---|---|---|---|---|---|---|---|---|---|---|---|---|
| Grape juice | 27 | 15.0 | 3.5 | ± | 12.0 | 2.5 | ++ | 5.0 | 2.5 | ++ | 4.6 | 2.5 |
| Malt juice | 27 | 15.0 | 5.0 | ± | 5.4 | 3.7 | ++ | 5.2 | 3.4 | ++ | 4.2 | 3.2 |

TABLE 5.—COMPARATIVE TEST FOR SHAKING CULTURE USING VARIOUS STRAINS

| Strain | 0 hr. Sugar, percent | pH | Deodorization effect | 12 hrs. Sugar, percent | pH | Deodorization effect | 24 hrs. Sugar, percent | pH | Deodorization effect | 48 hrs. Sugar, percent | pH | Deodorization effect | 72 hrs. Sugar, percent | pH |
|---|---|---|---|---|---|---|---|---|---|---|---|---|---|---|
| *Sacch. steineri* var. Hara | 13 | 5.0 | − | 12.2 | 4.6 | ± | 5.4 | 3.7 | ++ | 3.1 | 3.1 | ++ | 2.8 | 3.0 |
| *Sacch. steineri* | 13 | 5.0 | − | 12.9 | 4.8 | ± | 6.5 | 4.0 | + | 4.0 | 3.8 | ++ | 4.0 | 3.8 |
| *Sacch. c.v. ellipsoideus* | 13 | 5.0 | − | 12.8 | 4.8 | ± | 6.6 | 3.9 | + | 4.6 | 3.9 | ++ | 4.0 | 3.8 |
| *Sacch. cereviciae* | 13 | 5.0 | − | 12.9 | 4.9 | − | 10.1 | 4.0 | − | 10.0 | 4.0 | ± | 10.0 | 4.2 |

In Tables 3 and 4, both tests were carried out using a strain *Saccharomyces steineri* var. Hara (ATCC No. 13668). In Table 5, the tests were carried out at 27° C., using malt juice medium. In each of the above tables, signs (−), (±), (+) and (++) indicate the degree of deodorization effect.

In carrying out the invention in effect, the culture solution obtained by cultivation stated above is extracted with ether, and then the ether is removed from the extract. The remaining part is further concentrated to yield crude crystal of Gauche form β-cis-succinic acid. The crude product can be recrystallized from hot ether to give pure crystal.

In the alternative method of the invention, Gauche form β-cis-succinic acid may be prepared as follows: Firstly an yeast-containing liquor is recovered from the above said culture solution. A mixture containing equal a sugar content of 15 to 17%. Cultivation temperature was 25°±5° C. and cultivation period was 72 to 120 hours. During cultivation, the flask was shaken by means of a reciprocating type shaking machine which was reciprocated 120 times per minute with an amplitude of 8 cm. After cultivation, the culture solution was found to have a pH of 2.8 to 3.2 and a sugar content of 3 to 4%.

Extraction of β-cis-succinic acid of Gauche form from culture solution.—From the culture solution obtained by cultivation stated, mycelia were removed by filtration. The filtrate, charged into an automatic liquid extractor, was extracted with ether over 36 to 48 hours. An ether fraction was recovered, and the ether was removed under reduced pressure. The remaining part was further concentrated whereby crude crystal of β-cis-succinic acid of Gauche form was yielded. This crude crystal had yellow color and characteristic fermentative odor. From one liter of culture solution, about one gram of crude crystal was obtained.

The crude crystal thus obtained was dissolved into a small amount of hot ether, and then cooled in order for recrystallization. Repeating recrystallization, about 500 mg. of pure crystal were obtained from about one gram of the crude one.

Similarly β-cis-succinic acid of Gauche form was extracted from a culture solution which was obtained by cultivation of the other strains of Saccharomyces genus than *Sacch. steineri* var. Hara such as referred to above. In this case, 140 to 400 mg. of pure crystal was recovered from one liter of the culture solution.

Extraction of an yeast-containing liquor from the culture solution.—From the culture solution, mycelia were removed by filtration. By means of an automatic liquid extractor, the filtrate was extracted with ether for 36 to 48 hours. An ether fraction was recovered, and the ether was removed under reduced pressure. The remaining part was a brown colored liquid containing β-cis-succinic acid of Gauche form together with the yeast used. Such yeast-containing liquor was recovered in an amount of about 5 cc. from one liter of the culture solution.

Synthetic procedures using the yeast-containing liquor.—A mixture of equal amounts of known, commercially available succinic acid and maleic acid (or maleic anhydride) was dissolved with twice amount of 50% ethanol solution with heat. After cooling below 50° C., the resulting solution was combined with the above yeast-containing liquor which was in such amount as corresponding to more than 20% by weight of the said solution. While shielding from day light, the resulting mixture was concentrated under reduced pressure of less than 20 mm. Hg, whereby crude crystal of β-cis-succinic acid of Gauche form was yielded. The crude crystal could be recrystallized in the same manner mentioned above.

It should be noted that any other solvent than ether can not be used for the recovery of Gauche form cis-succinic acid from the culture solution because such solvent can not dissolve selectively the desired substance, and in the present, therefore, ether should be critically used for the extraction of the substance.

The cis-succinic acid of Gauche form of the present invention is characterized by the physical, chemical and physiological properties set forth in the following paragraphs.

Melting point.—Melting points of three samples including the present compound were determined macroscopically as follows:

|  | M.P., °C. |
|---|---|
| The present compound (β-form) | 183 to 184 |
| Succinic acid, commercially available | 185 to 186 |
| Mixed sample of the above two | 184 to 185 |

Then a melting point of the present compound was determined by micro method, and the following physical change was observed.

Room temp. (six diamond, plate or pillar shaped crystal):

→Sublimation point (135°–150° C.) (crystal form unchanged; β-form)
→160° C. or above, needle shaped crystal; α-form)
→Melting (194° to 195° C.)

In the above change, the sublimating point seems to be correspondent with the metastasis point (transition point) from β-succinic acid to α-succinic acid, as proposed by Dupre La Tour, Compt. pend., vol. 193, p. 180 (1931).

That is, the α- and β-forms are the polymorphism of succinic acid.

Determination of molecular weight.—Molecular weight of the substance was determined according to Akiya and Berger's method. Alcohol was used as solvent and azobenzene as known control. As the result, it was found that the molecular weight of the substance was approximately 120.

Elementary analysis.—Elementary analysis of this substance showed that the substance contained 40.83% of carbon, 5.14% of hydrogen and 54.03% oxygen, but not nitrogen and halogen. See Table 6.

TABLE 6.—ELEMENTARY ANALYSIS

|  | C, percent | H, percent | $N_2$ c.c. | N, percent |
|---|---|---|---|---|
| The present substance | 40.83 | 5.14 | 0 | 0 |
| Succinic acid, commercially available | 40.68 | 5.12 | 0 | 0 |
| Maleic acid | 41.39 | 3.47 | 0 | 0 |

Acid titration and the curve thereof.—An aqueous solution of this substance was titrated with N/10–NaOH aqueous solution, and as its result the molecular weight was found to be about 119. Further such titration was repeated using an electric titration apparatus, and the data were plotted on a titration curve. The present substance gave the similar titration curve to that of known succinic acid, and was found to be dicarboxylic acid. (See FIG. 1.)

Qualitative test of carbonyl group.—The precipitation reaction using 2,4-dinitrophenyl hydrazine was carried out for determining whether carbonyl group was present or not in the substance. It was found that the present substance had not C=O group.

Qualitative test of hydroxyl group.—As the result of diazo color reaction, it was found that the present substance did not contain hydroxyl group.

Qualitative test of ethylenical double bond.—The decolorization reaction of an aqueous solution of this substance by a potassium permanganate aqueous solution, and the decolorization reaction of a glacial acetic acid solution of this substance by a glacial acetic acid solution of bromine were tested, and in both cases decolorization was not observed. It was found that this substance had not an ethylenical double bond (C=C).

Solubility to various organic solvents.—This substance has a relatively higher solubility in water, ethanol or ether, than that of a known, commercially available succinic acid. Also this substance is slightly soluble in benzene and chloroform, and unsoluble in petroleum ether and carbon tetrachloride.

Specific rotation.—This substance (β-form) and the polymorph thereof and a known, commercially available succinic acid were measured their specific rotation:

|  | $[\alpha]_D$ |
|---|---|
| The present substance: |  |
| (β-form) (1% aq. soln.) | 18.1° |
| (α-form) (1% aq. soln.) | 18.4° |
| Commercially available succinic acid (1% aq. soln.) | —1.7° |

The brucine salt of this substance and that of a known succinic acid were measured their specific rotation.

|  | $[\alpha]_D$ |
|---|---|
| Brucine salt of this substance (1% aq. soln.) | —19.3° |
| Brucine succinate, commercially available (1% aq. soln.) | 32.3° |

Figure 2:
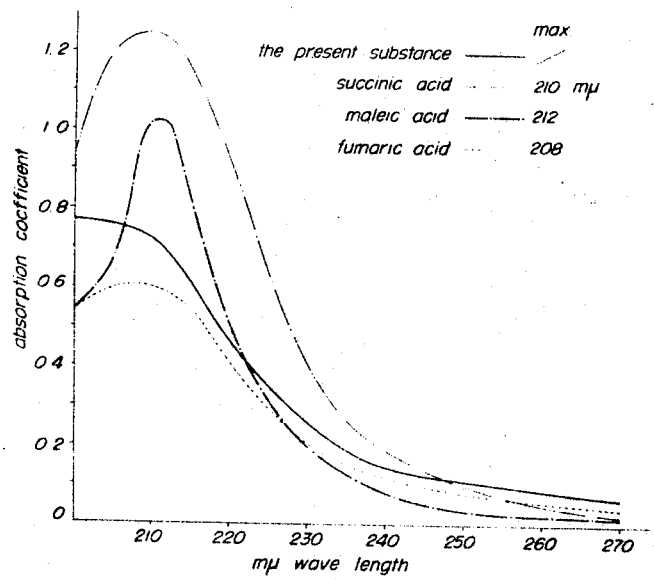
FIG. 2 is a curve of the ultra-violet spectrum of $\beta$-cis-succinic acid in Gauche form.

Ultra-violet absorption.—In this test, an aqueous solution of this substance (1 mg./10 cc.) was used as sample. For contrast, known succinic acid, maleic acid and fumaric acid were employed. As shown in FIG. 2, the ultra-violet absorption spectrum of the substance shows only one maximum at 200 mμ, while those of succinic, maleic and fumaric acids show one maximum at 210 mμ, 212 mμ and 208 mμ, respectively.

Figure 3:
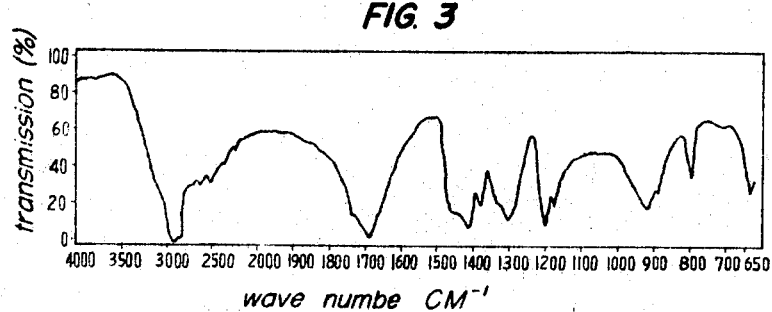
FIG. 3 is a curve of the infra-red spectrum of $\beta$-cis-succinic acid in Gauche form.

Infra-red absorption.—The infra-red absorption spectrum of this substance is entirely similar to that of a known, commercially available succinic acid, as seen in FIG. 3.

Anhydride of β-cis-succinic acid of Gauche form.—The substance (β-cis-succinic acid of Gauche form) is completely sublimated at temperatures between 135° and 150° C. thereby to convert into its anhydrous form. Such anhydrous substance is characterized by that the infra-red absorption spectrum thereof shows absorption bands at wave length: 1780 and 1875 m.$^{-1}$. This anhydrous substance when dissolved into water, immediately is converted into dicarboxylic acid by ring opening.

Reactivity test with other compounds.—When a 1 N aqueous solution of this substance is added with a 1 N ammonia solution, the reaction between both proceeds at room temperature whereby asparagine and aspartic acid are formed.

$R_f$ values on paper chromatogram. — The following data show the $R_f$ values of the substance and other various known organic acids, which are determined by one dimensional paper-chromatogram.

TABLE 7

| Acid | $R_f$ value | | |
|---|---|---|---|
| | Run No. 1 | Run No. 2 | Run No. 3 |
| This substance (β-form) | 0.32 | 0.45 | 0.26 |
| This substance (α-form) | 0.31 | 0.44 | 0.26 |
| Succinic acid, commercially available | 0.34 | 0.50 | 0.27 |
| Fumaric acid | 0.37 | 0.16 | 0.27 |
| Maleic acid | 0.31 | 0.44 | 0.26 |
| Gallic acid | 0.24 | 0.24 | 0.16 |
| Malonic acid | 0.16 | 0.39 | 0.13 |

The developing solvents used as follows:

| Run No. 1 | Ethanol | 80 |
| | Ammonia water | 4 |
| | Water | 16 |
| Run No. 2 | Phenol | 80 |
| | Water | 20 |
| Run No. 3 | n-Propanol | 70 |
| | Ammonia water | 30 |

In each of runs, the development was carried out at 20° C. for 15 hours, using Toyo filter paper No. 50 or 51 and bromo cresol green as coloring agent.

Physiological activity of this substance.—When fresh fish meat, whale meat, bird and animal meat, and the internal organs thereof are immersed into a 0.1 to 0.05% aqueous solution of this substance, the peculiar offensive odor disappears after immersion at any ordinary temperature for 2 to 6 hours or at 0° to 5° C. for 24 to 96 hours.

Fish or animal meat is digested with proteinase, and then indigestible residue and fat and fatty oils are removed therefrom. The resulting solution is adjusted with a 5 N KOH aqueous solution at a pH of 7.0 to 7.4, and this substance is added in an amount of 0.1 to 0.05% to the said solution. While maintained at 70° to 100° C. for 60 minutes, the solution is readjusted at a pH of 7.6 to 8.0. After filtration, the filtrate is adjusted at a pH of 5.0 with 5 N HCl, and then concentrated to about one-fifth volume. The concentrate is added with about 1 or 2% starch, and then spray- or freeze-dried, whereby a deodorized powder containing a large amount of essential amino acids is obtained. Such powder is suited for the use of animal feed.

A crude liquor of sodium glutamate is adjusted at a pH of 7.0 to 7.2 by addition of 5 N KOH, and then heated up to 70° C. The liquor is added with 0.1 to 0.05% of the present substance, allowed to stand for 30 to 60 minutes, and then blown with sterile air for 10 to 20 minutes. Volatile, odoriferous materials mainly including dimethyl sulfite are liberated and sparged away. The liquor thus treated is adjusted at a pH of 7.6 to 8.0 with a KOH aqueous solution and then filtered. The filtrate is adjusted at a pH of 4.6 to 4.7 with 5 N HCl. Thus a deodorized solution of sodium glutamate (or amino acids) is obtained.

Mucous odor and putrefied tissue odor are removed by washing the area with a 0.1–0.05% aqueous solution of this substance. Also toilet odor can be killed by addition of the said solution. The smell of armpit is prevented by applying an ointment containing 0.1 to 1.0% of this substance.

Toxic amines such as histamine, indole and scatole, when reacted with the substance, are converted to such compounds which are non-toxic and odorless.

What is claimed is:

1. The β-form of gauche-cis-succinic acid, having a positive specific rotation $[\alpha]_D$ in 1%-aqueous solution of 18.1, an infra-red absorption spectrum as shown in FIG. 3 of the drawings, a melting point of 183–184° C., said β-form being the stable allotropic modification of gauche-cis-succinic acid at room temperature, and being soluble in water and ethanol, soluble in ether, slightly soluble in benzene and chloroform, and insoluble in petroleum ether and carbon tetrachloride.

2. The α-form of gauche-cis-succinic acid having a positive specific rotation $[\alpha]_D$ in 1%-aqueous solution of 18.4, the β-form of which having an infra-red absorption spectrum as shown in FIG. 3 of the drawings, a melting point of 194–195° C., said α-form being the stable allotropic modification of gauche-cis-succinic acid at about 160° C. and up to the melting point thereof, and being soluble in water and ethanol, soluble in ether, slightly soluble in benzene and chloroform, and insoluble in petroleum ether and carbon tetrachloride.

References Cited

UNITED STATES PATENTS

| 1,611,531 | 12/1926 | Kahn | 195—29 |
| 1,851,253 | 3/1932 | Kahn | 195—29 |
| 1,929,381 | 10/1933 | Jaeger et al. | 260—537 |
| 2,072,919 | 3/1937 | Zender | 195—36 |
| 2,141,406 | 12/1938 | Reid | 260—537 |
| 2,206,622 | 7/1940 | Weittman | 195—29 |
| 2,326,986 | 8/1943 | Waksman | 195—36 |
| 2,459,574 | 1/1949 | Moyer | 195—29 |
| 2,536,171 | 1/1951 | Hall | 195—29 |
| 3,000,789 | 9/1961 | Bertullo | 195—29 |

OTHER REFERENCES

Dupre La Tour, Compt. Rend., vol. 191, pp. 1348–50 (1930).

La Tour, Compt. Rend., vol. 193, pp. 180–182 (1931).

J. Nat. Inst. of Brewing, November 1940, p. 420.

LORRAINE A. WEINBERGER, *Primary Examiner.*

VIVIAN GARNER, *Assistant Examiner.*

U.S. Cl. X.R.

99—107; 195—29, 37